(12) United States Patent
Isono

(10) Patent No.: US 8,505,409 B2
(45) Date of Patent: Aug. 13, 2013

(54) ROTARY MOTION INPUT TYPE MANIPULATION SIMULATOR

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1048 days.

(21) Appl. No.: 12/517,364

(22) PCT Filed: Nov. 30, 2007

(86) PCT No.: PCT/JP2007/073629
§ 371 (c)(1),
(2), (4) Date: Jun. 3, 2009

(87) PCT Pub. No.: WO2008/069292
PCT Pub. Date: Jun. 12, 2008

(65) Prior Publication Data
US 2010/0064842 A1    Mar. 18, 2010

(30) Foreign Application Priority Data
Dec. 8, 2006    (JP) .................................. 2006-332317

(51) Int. Cl.
*G05G 1/30*    (2008.04)
(52) U.S. Cl.
USPC .......................................................... 74/512
(58) Field of Classification Search
USPC ............................................. 74/52, 512, 567
See application file for complete search history.

(56) References Cited

U.S. PATENT DOCUMENTS

| | | | |
|---|---|---|---|
| 1,331,076 A | * | 2/1920 | Mitchell ........................ 74/567 |
| 4,192,224 A | | 3/1980 | Okamura |

(Continued)

FOREIGN PATENT DOCUMENTS

| | | |
|---|---|---|
| DE | 199 54 708 A1 | 5/2001 |
| DE | 100 39 670 A1 | 3/2002 |
| JP | 50 107878 | 9/1975 |
| JP | 53 76263 | 7/1978 |

(Continued)

OTHER PUBLICATIONS

German Office Action issued Sep. 22, 2011, in Patent Application No. 11 2007 002 879.3 (with English-language translation).

*Primary Examiner* — Justin Krause
(74) *Attorney, Agent, or Firm* — Oblon, Spivak, McClelland, Maier & Neustadt, L.L.P.

(57) ABSTRACT

An object of the present invention is to impart a preferred continuous nonlinear characteristic to the relation between the magnitude of operation and an operational reaction force over the entire range of operation of operation means even when a reaction generation spring has a linear spring characteristic. A rotary-motion-input-type manipulation simulator includes an input member which rotates in accordance with a braking operation of a driver applied to a brake pedal; the brake pedal which rotates about the axis and imparts a rotary motion to the input member; a compression coil spring which generates a reaction force linearly according to an amount of deformation thereof; an output member which deforms the compression coil spring; and transmission apparatus provided between the input member and the output member and adapted to convert the rotary motion of the input member to a rectilinear motion and transmit the rectilinear motion to the output member and to transmit the reaction force of the compression coil spring to the input member via the output member. The transmission apparatus continuously and nonlinearly varies a ratio of an amount of rectilinear motion of the output member to an amount of rotary motion of the input member according to the amount of rotary motion of the input member.

11 Claims, 5 Drawing Sheets

(56) References Cited

U.S. PATENT DOCUMENTS

| | | | | |
|---|---|---|---|---|
| 4,192,244 | A * | 3/1980 | Kelley et al. | 413/17 |
| 6,364,046 | B1 * | 4/2002 | Forssell et al. | 180/275 |
| 6,446,526 | B2 * | 9/2002 | Reimann et al. | 74/512 |
| 7,950,275 | B2 * | 5/2011 | Isono | 73/132 |
| 2005/0145057 | A1 * | 7/2005 | Fujiwara | 74/512 |
| 2005/0172753 | A1 | 8/2005 | Fujiwara | |

FOREIGN PATENT DOCUMENTS

| | | |
|---|---|---|
| JP | 7 277173 | 10/1995 |
| JP | 10 138891 | 5/1998 |
| JP | 2005 112034 | 4/2005 |
| JP | 2005 219687 | 8/2005 |
| JP | 2006 193012 | 7/2006 |
| JP | 2006-193012 | 7/2006 |

* cited by examiner

ROTARY MOTION INPUT TYPE
MANIPULATION SIMULATOR

TECHNICAL FIELD

The present invention relates to a manipulation simulator and, more particularly, to a rotary-motion-input-type manipulation simulator, such as a brake stroke simulator of a brake apparatus of an automobile or a like vehicle, which permits an operator to operate an operation means and applies a required operational reaction force to the operator via the operation means.

BACKGROUND ART

In a brake apparatus of a vehicle, such as an automobile, when a driver depresses a brake pedal, braking operation is performed. In the case of a brake apparatus in which braking pressures for wheels are controlled on the basis of the magnitude of braking operation by the driver, generally, the rate of increase of an operational reaction force which the driver feels gradually increases with the magnitude of braking operation by the driver. Thus, the magnitude of braking operation by the driver (brake stroke) and the operational reaction force (brake reaction force) are preferably in a nonlinear relation.

Conventionally, there have been proposed brake stroke simulators of various configurations which achieve a nonlinear characteristic of brake stroke vs. brake reaction force. For example, Japanese Patent Application Laid-Open (kokai) No. 2005-112034 describes a brake stroke simulator configured to be able to adjust a nonlinear brake stroke vs. brake reaction characteristic.

A conventional brake stroke simulator in which a brake stroke and a brake reaction force are in a nonlinear relation generally has a plurality of reaction force generation springs whose spring constants are fixed and differ from one another. In generation of reaction force, the different reaction force generation springs are individually selected according to a brake stroke, thereby achieving a nonlinear characteristic. Accordingly, the relation of the brake reaction force to a brake stroke is of discontinuous nonlinearity; in other words, the relation fails to exhibit preferred continuous nonlinearity.

In order for the relation of the brake reaction force to the brake stroke to be of continuous nonlinearity, a single reaction force generation spring having a nonlinear spring characteristic can conceivably be used. However, it is very difficult to form a reaction force generation spring which imparts preferred continuous nonlinearity to the relation of the brake reaction force to the brake stroke over the entire range of brake stroke.

The above-mentioned problem in relation to a brake stroke vs. brake reaction force nonlinear characteristic is not limitingly involved only in the brake stroke simulator, but is also involved in other manipulation simulators, such as a flight simulator, in which operation means is operated by an operator and which allows the operator to operate the operation means and applies an operational reaction force to the operator via the operation means.

DISCLOSURE OF THE INVENTION

A primary object of the present invention is to provide a rotary-motion-input-type manipulation simulator in which, by means of imparting continuous nonlinearity to the relation between the magnitude of an operator's operation applied to operation means and the amount of deformation of a reaction force generation spring, even when the reaction generation spring has a linear spring characteristic, the relation between the magnitude of operation and an operational reaction force exhibits a preferred continuous nonlinear characteristic over the entire range of the operation applied to the operation means.

The present invention provides a rotary-motion-input-type manipulation simulator comprising an input member which is rotatable about an axis; operation means which rotates about the axis when operated by an operator, and imparts a rotary motion to the input member; an output member whose rectilinear motion deforms a reaction force generation means which generates a reaction force according to an amount of deformation thereof; and transmission means provided between the input member and the output member and adapted to convert the rotary motion of the input member to a rectilinear motion and transmit the rectilinear motion to the output member and to transmit the reaction force of the reaction force generation means to the input member via the output member. The manipulation simulator allows the operator to operate the operation means, and applies an operational reaction force to the operator via the operation means. The reaction force generation means generates the reaction force linearly according to the amount of deformation thereof; and the transmission means is configured to continuously and nonlinearly vary a ratio of an amount of rectilinear motion of the output member to an amount of rotary motion of the input member according to the amount of rotary motion of the input member.

According to this configuration, the ratio of the amount of deformation of the reaction force generation means to the amount of rotary motion of the input member can be varied continuously and nonlinearly according to the amount of rotary motion of the input member. Accordingly, even when the reaction force generation means generates a reaction force linearly according to the amount of its deformation, desired continuous nonlinearity can be imparted to the relation of reaction force of the reaction force generation means to the amount of rotary motion of the input member. Thus, the relation between the magnitude of operation and an operational reaction force can exhibit a preferred continuous nonlinear characteristic over the entire range of the operation applied to the operation means.

The above-mentioned configuration may be such that: the transmission means includes a cam provided on the input member and a cam follower provided on the output member and engaged with the cam, and, by means of the cam follower moving to follow the cam, the ratio of the amount of rectilinear motion of the output member to the amount of rotary motion of the input member is varied continuously and nonlinearly according to the amount of rotary motion of the input member.

According to this configuration, the ratio of the amount of rectilinear motion of the output member to the amount of rotary motion of the input member can be reliably varied continuously and nonlinearly according to the amount of rotary motion of the input member and can exhibit a desired continuous nonlinear characteristic through setting of the cam and the cam follower.

The above-mentioned configuration may be such that: the input member and the output member are coaxial with respect to the axis and are fitted to each other such that they can move in relation to each other.

According to this configuration, as compared with, for example, a structure in which the input member and the output member are disposed along the axis, the axial length of the manipulation simulator can be reduced, whereby the manipulation simulator can be rendered compact.

The above-mentioned configuration may be such that: the transmission means converts a rotary motion of the input member to a rectilinear motion and transmits the rectilinear motion to the output member, and the transmission means converts a reaction force which the output member receives from the reaction force generation means, to a reaction torque directed opposite a direction in which the input member rotates to increase the amount of rotary motion thereof and transmits the reaction torque to the input member.

According to this configuration, a reaction force generated through deformation of the reaction force generation means in the direction of rectilinear motion of the output member can be reliably transmitted to the operation means as a reaction force directed opposite a direction in which the operation means is pivoted to increase the magnitude of operation thereof.

The above-mentioned configuration may be such that: one of the cam and the cam follower is a cam groove, whereas the other of the cam and the cam follower is a cam groove engagement member which is engaged with the cam groove and moves along the cam groove, and the cam groove extends while being inclined with respect to a circumferential direction about the axis and is curved such that an angle of inclination with respect to the circumferential direction varies gradually and continuously.

According to this configuration, by means of the cam groove engagement member engaged with the cam groove moving along the cam groove, the ratio of the amount of rectilinear motion of the output member to the amount of rotary motion of the input member can be varied continuously and nonlinearly according to the amount of rotary motion of the input member and thus can exhibit a desired continuous nonlinear characteristic through setting of the shape of curve of the cam groove.

The above-mentioned configuration may be such that: through subjection to deformation along the axis, the reaction force generation means generates a reaction force along the axis linearly according to the amount of deformation.

According to this configuration, a reaction force along the axis which increases and decreases linearly according to the amount of rectilinear motion along the axis of the output member can be applied to the output member.

The above-mentioned configuration may be such that: the input member is supported by the housing to be rectilinearly movable, and defines two cylinder chambers on opposite sides thereof in cooperation with the housing; and one of the cylinder chambers whose volume decreases with an increase in the amount of rotary motion of the input member is filled with a working fluid, and is connected to and communicates with an apparatus which is operated by the pressure of the working fluid.

According to this configuration, the working fluid can be supplied to the apparatus which is operated by the pressure of the working fluid, in such a manner that the ratio of the amount of supply of the working fluid to the amount of rotary motion of the input member gradually increases with the amount of rotary motion of the input member. Accordingly, the working fluid can be supplied to the apparatus which is operated by the pressure of the working fluid, in such a manner that the ratio of the amount of supply of the working fluid to the amount of driver's operation applied to the operation means gradually increases with the amount of rotary motion of the input member.

The above-mentioned configuration may be such that: the cylinder chamber whose volume increases with the amount of rotary motion of the input member is connected to and communicates with means which controls the pressure within the cylinder chamber.

According to this configuration, the pressure within the cylinder chamber whose volume increases with the amount of rotary motion of the input member can be controlled. Thus, the operator's operation applied to the operation means can be assisted, and the working fluid can be supplied to the apparatus which is operated by the pressure of the working fluid, independently of the operator's operation applied to the operation means.

The above-mentioned configuration may be such that: the transmission means is configured to convert a rotary motion of the input member to a rectilinear motion in a direction intersecting the axis, and transmit the rectilinear motion to the output member.

According to this configuration, the direction of rectilinear motion of the output member can be set to intersect the axis. Accordingly, the direction of deformation of the reaction force generation means by the output member can be set to intersect the axis.

The above-mentioned configuration may be such that: the cam groove engagement member has a shaft member which is fixed to the output member and extends in a radial direction, and a cam roller which is rotatably supported by the shaft member and is rollably engaged with a wall surface of the cam groove.

According to this configuration, as compared with a structure in which the cam groove engagement member is not rollably engaged with the wall surface of the cam groove, friction between the cam groove engagement member and the wall surface of the cam groove can be reduced, whereby the conversion of motion between the rotary motion of the input member and the rectilinear motion of the output member can be smoothly carried out.

The above-mentioned configuration may be such that: the cam groove engagement member has a guide roller which is rotatably supported by the shaft member and is rollably engaged with a wall surface of the guide groove extending along the direction of rectilinear motion of the output member.

According to this configuration, as compared with a structure which does not have the guide roller rollably engaged with the wall surface of the guide groove, the shaft member can be reliably moved along the direction of rectilinear motion of the output member, whereby the conversion of motion between the rotary motion of the input member and the rectilinear motion of the output member can be smoothly carried out.

The above-mentioned configuration may be such that: the transmission means is configured to continuously and nonlinearly vary the ratio of the amount of rectilinear motion of the output member to the amount of rotary motion of the input member according to the amount of rotary motion of the input member so that the ratio of the amount of rectilinear motion of the output member to the amount of rotary motion of the input member gradually increases with the amount of rotary motion of the input member.

The above-mentioned configuration may be such that: the operation means pivots about the axis.

The above-mentioned configuration may be such that: the operation means is integrally connected at one end thereof to the input member.

The above-mentioned configuration may be such that: the input member is supported by the housing in such a manner that the input member surrounds the housing and can rotate about the axis; and the output member is supported by the housing in such a manner that the output member can rectilinearly move along the axis within the housing.

The above-mentioned configuration may be such that: a plurality of cam grooves and cam groove engagement members are provided while being spaced apart from one another at equal intervals around the axis.

The above-mentioned configuration may be such that: the cam grooves are provided on the output member, and the cam groove engagement members are supported by the output member.

The above-mentioned configuration may be such that: the apparatus which is operated by the pressure of the working fluid acts as reaction force generation means by imparting a reaction force corresponding to the pressure of the working fluid to the output member.

The above-mentioned configuration may be such that: the transmission means is configured to convert a rotary motion of the input member to a rectilinear motion along a direction intersecting the axis by means of an eccentric cam, and transmit the rectilinear motion to the output member.

The above-mentioned configuration may be such that: the input member is supported by the housing in such a manner that the input member surrounds the housing and can rotate about the axis; and the guide groove is provided in the housing.

BEST MODE FOR CARRYING OUT THE INVENTION

Several preferred embodiments of the present invention will now be described in detail with reference to the attached drawings.

First Embodiment

Figure 1:
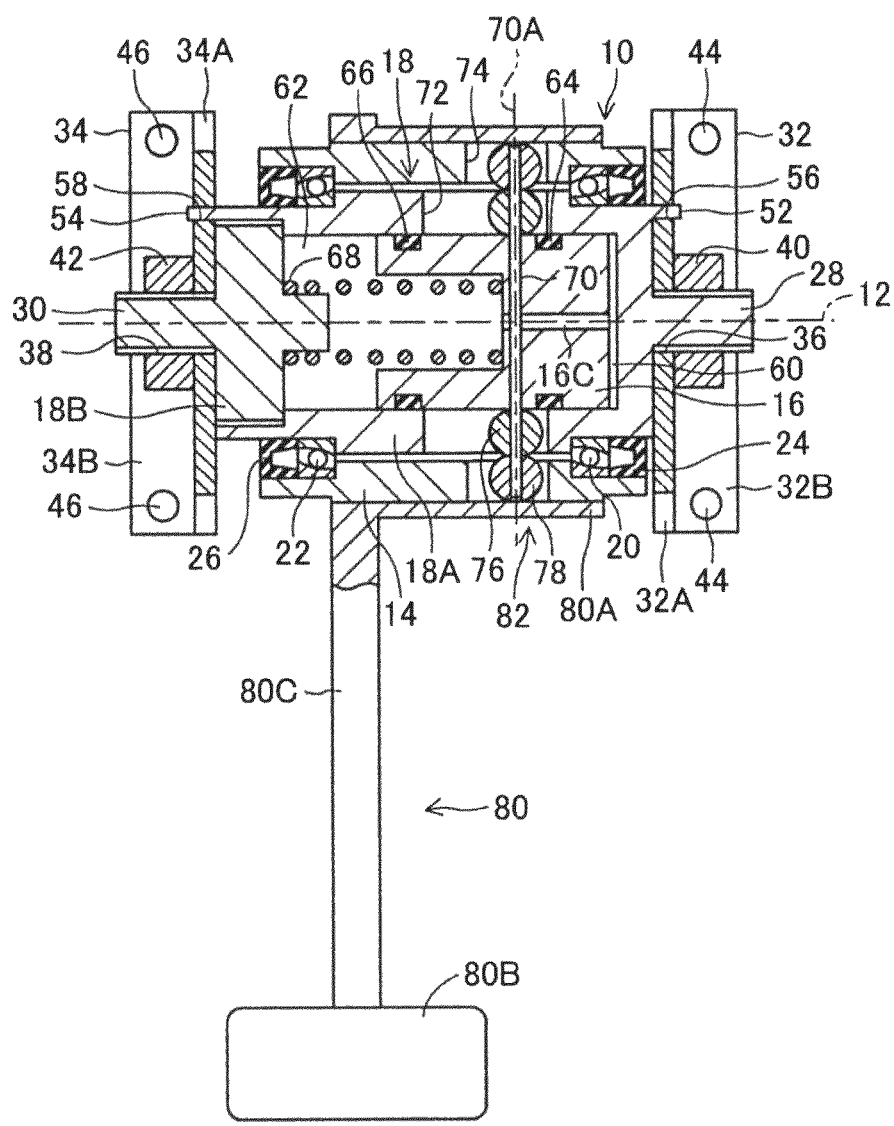
FIG. 1 is an axially-taken sectional view showing a first embodiment of a manipulation simulator according to the present invention and configured as a brake stroke simulator used in a brake-by-wire-type brake apparatus.
Figure 2:
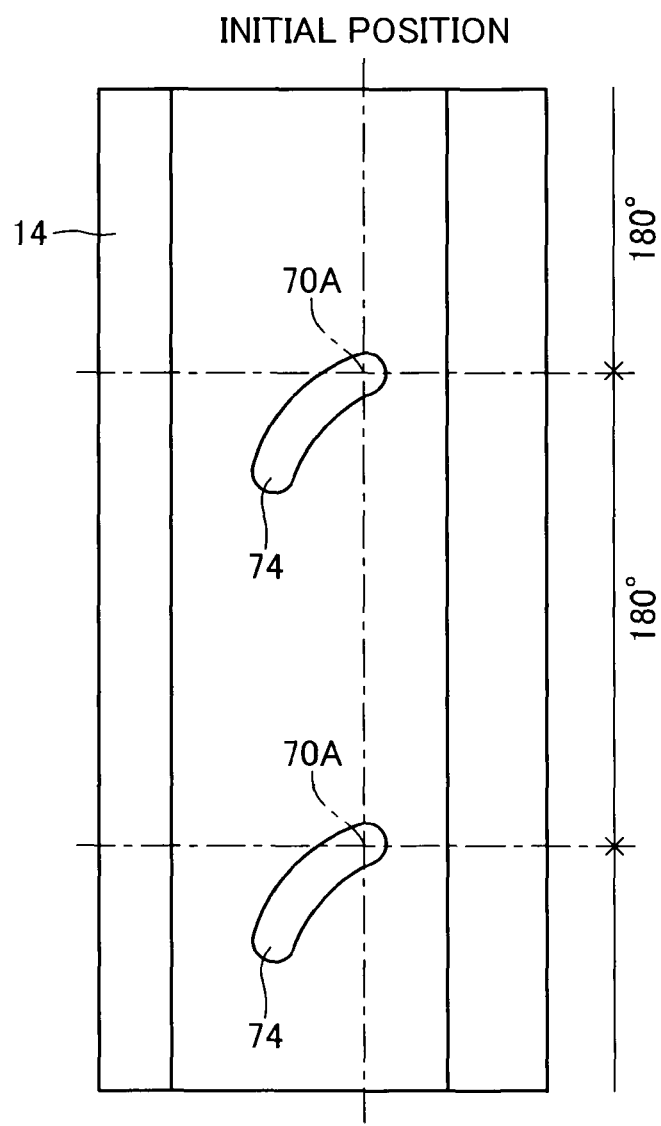
FIG. 2 is a development view in which an output rotor of the first embodiment is developed on a plane.
Figure 3:
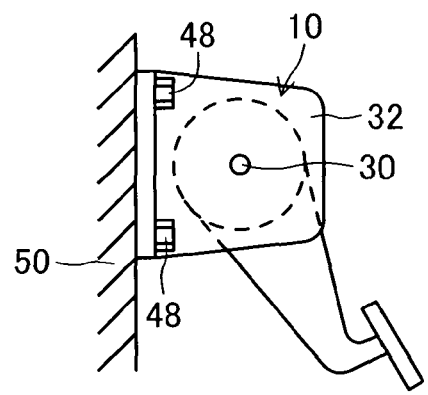
FIG. 3 is an illustrative side view showing the manipulation simulator of the first embodiment mounted on a vehicle.

FIG. 1 is an axially-taken sectional view showing a first embodiment of a manipulation simulator according to the present invention and configured as a brake stroke simulator used in a brake-by-wire-type brake apparatus. FIG. 2 is a development view in which an output rotor of the first embodiment is developed on a plane. FIG. 3 is an illustrative side view showing the manipulation simulator of the first embodiment mounted on a vehicle.

In these drawings, reference numeral 10 denotes the entirety of a brake stroke simulator. The brake stroke simulator 10 includes an input rotor (input member) 14 which can rotate about an axis 12; an output piston (output member) 16 which can move rectilinearly along the axis 12; and a housing 18 which supports the input rotor 14 to be rotatable about the axis 12 and supports the output piston 16 to be movable rectilinearly along the axis 12.

The housing 18 is composed of a cylindrical portion body 18A which opens at one end thereof and extends along the axis 12; and an end cap 18B fixed to the open end of the body 18A by means of screwing, press fit, or the like. The input rotor 14 is loosely fitted onto the outer periphery of the cylindrical portion of the housing 18, and is supported, at opposite ends along the axis, by means of angular bearings 20 and 22 provided between the input rotor 14 and the body 18A such that the input rotor 14 can rotate about the axis 12 in relation to the housing 18.

The angular bearings 20 and 22 permit the input rotor 14 to rotate about the axis 12 in relation to the housing 18, but prevent the input rotor 14 from moving along the axis 12 in relation to the housing 18. Cup seals 24 and 26, which annularly extend about the axis 12, are fitted to the outer sides of the angular bearings 20 and 22 with respect to the axial direction. The cup seals 24 and 26, which are formed of an elastic material such as rubber, permit the input rotor 14 to rotate about the axis 12 in relation to the housing 18, and prevent entry of foreign matter such as dust and muddy water into the angular bearings 20 and 22.

Support shafts 28 and 30 are integrally provided on the end wall of the body 18A and the end cap 18B, respectively, such that the support shafts 28 and 30 project in opposite directions along the axis 12. The support shafts 28 and 30 are passed through holes 36 and 38 provided in lug portions 32A and 34A of mount brackets 32 and 34. The support shafts 28 and 30 have external threads, and nuts 40 and 42 are in screw-engagement with these external threads. The nut 40 is located on the side of the lug portion 32A opposite the end wall of the body 18A, and the nut 42 is located on the side of the lug portion 34A opposite the end cap 18B. Thus, the housing 18 is supported by the mount brackets 32 and 34 to be located therebetween.

The mount brackets 32 and 34 have base portions 32B and 34B, which extend perpendicularly to the lug portions 32A and 34A, respectively. Two bolt holes 44 are provided in the base portion 32B near the opposite ends thereof. Similarly, two bolt holes 46 are provided in the base portion 34B near the opposite ends thereof. As shown in FIG. 3, the mount brackets 32 and 34 are attached to a vehicle body 50 by use of bolts 48 passed through the bolt holes 44 and 46.

Particularly, in the illustrated embodiment, a projection 52 is integrally provided on the body 18A at a position separated radially outward from the support shaft 28 such that the projection 52 projects along the axis 12 in the same direction as the projection direction of the support shaft 28. Similarly, a projection 54 is integrally provided on the end cap 18B at a position separated radially outward from the support shaft 30 such that the projection 54 projects along the axis 12 in the same direction as the projection direction of the support shaft 30. The projections 52 and 54 are passed through engagement holes 56 and 58, respectively, which are provided in the lug portions 32A and 34A of mount brackets 32 and 34. Thus, rotation of the housing 18 about the axis 12 can be prevented without fail.

The output piston 16 is disposed within the cylindrical portion of the housing 18 to be reciprocatable along the axis 12, and has a squarish-C-shaped cross section which opens toward the end cap 18B side. In cooperation with the housing 18, the output piston 16 defines a first cylinder chamber 60 and a second cylinder chamber 62. These cylinder chambers communicate with each other via a communication hole 16C provided in the output piston 16. Antifriction rings (e.g., Teflon (registered trademark) rings) 64 and 66 are attached to the outer circumferences of opposite ends portions of the output piston 16. The antifriction rings 64 and 66 reduce friction resistance at the time of the output piston 16 rectilinearly moving in relation to the housing 18. Within the second cylinder chamber 62, a compression coil spring (reaction force generation means) 68 is elastically disposed between the output piston 16 and the end cap 18B. The compression coil spring 68 has linear spring characteristics, and extends along the axis 12.

A load transmission rod 70, which passes through the output piston 16 and extends perpendicular to the axis 12, is fixed to the output piston 16 by means of press fit or the like. Opposite end portions of the load transmission rod 70 pass through guide grooves 72 formed in the cylindrical side wall of the housing 18 and extend into cam grooves 74 provided in the input rotor 14. Further, the opposite end portions of the load transmission rod 70 support substantially spherical guide rollers 76 and cam rollers 78 to be rotatable about an axis 70A of the load transmission rod 70. Each guide roller 76 is rollably engaged with the wall surface of the corresponding guide groove 72. Each cam roller 78 is rollably engaged with the wall surface of the corresponding cam groove 74. Each of the guide grooves 72 has a width slightly greater than the maximum diameter of the guide rollers 76. Similarly, each of the cam grooves 74 has a width slightly greater than the maximum diameter of the came rollers 78.

The two guide grooves 72 are spaced 180° apart from each other about the axis 12 and extend rectilinearly in parallel with the axis 12. Accordingly, the guide rollers 76 can only move in the respective guide grooves 72 rectilinearly along the axis 12, except for rotary motion about the load transmission rod 70. The two cam grooves 74 are also spaced 180° apart from each other about the axis 12. However, as shown in FIG. 2, the cam grooves 74 are curved and extend while being inclined with respect to the axis 12 and the circumferential direction. Accordingly, each of the cam rollers 78 can only move in the cam groove 74 along a trajectory of motion which is curved and inclined with respect to the axis 12 and the circumferential direction, except for rotary motion about the load transmission rod 70.

A cylindrical tubular portion 80A of a brake pedal 80 is disposed to surround the input rotor 14 and extends along the axis 12. The cylindrical tubular portion 80A is integrally fixed to the input rotor 14 by means of press fit or the like. Thus, the brake pedal 80 can pivot about the axis 12. The cylindrical tubular portion 80A covers the cam grooves 74 from the radially outer side thereof, so that the cam grooves 74 are isolated from the outside. The brake pedal 80 has a pedal portion 80B at an end opposite the cylindrical tubular portion 80A. A driver depresses the pedal portion 80B with his/her foot. The cylindrical tubular portion 80A and the pedal portion 80B are connected together via an arm portion 80C. Notably, pivot movement of the brake pedal 80 in a return direction is restricted by means of an unillustrated stopper, whereby, during nonbraking periods, the brake pedal 80 is positioned at an initial position set by the stopper.

Thus, in the illustrated first embodiment, the load transmission rod 70, the guide grooves 72, the cam grooves 74, the guide rollers 76, etc. cooperatively function as a transmission means 82 for converting a rotary motion about the axis 12 of the input rotor 14 to a rectilinear motion along the axis 12; transmitting the rectilinear motion to the output piston 16; deforming the compression coil spring 68 via the output piston 16; and transmitting the axial reaction force of the compression coil spring 68 to the input rotor 14 as a reaction force which acts on the input rotor 14 so as to return the brake pedal 80 about the axis 12.

Particularly, the transmission means 82 in the present embodiment varies the ratio of the amount of rectilinear motion of the output piston 16 to the amount of rotary motion of the input rotor 14 according to the amount of rotary motion of the input rotor 14 such that the ratio of the amount of rectilinear motion of the output piston 16 to the amount of rotary motion of the input rotor 14 gradually increases with the amount of rotary motion of the input rotor 14, thereby varying the ratio of the amount of deformation of the compression coil spring 68 to the amount of rotary motion about the axis 12 of the input rotor 14 according to the amount of rotary motion of the input rotor 14 such that the ratio of the amount of deformation of the compression coil spring 68 to the amount of rotary motion about the axis 12 of the input rotor 14 gradually increases with the amount of rotary motion of the input rotor 14.

Particularly, in the illustrated first embodiment, the two guide grooves 72 and the two cam grooves 74 are respectively spaced 180° apart from each other about the axis 12. The right ends of the guide grooves 72 and the right ends of the cam grooves 74 as viewed in FIG. 1 are located at the same axial position along the axis 12. At the time of nonbraking when no treading force is applied to the brake pedal 80, a spring force of the compression coil spring 68 is applied to the output piston 16, whereby the guide rollers 76 and the cam rollers 78 are positioned at their initial positions, where the guide rollers 76 and the cam rollers 78 are in contact with the right ends of the guide grooves 72 and the right ends of the cam grooves 74, respectively, as viewed in FIG. 1. When the guide rollers 76 and the cam rollers 78 are positioned at their initial positions, the output piston 16 is positioned at its initial position, where the volume of the first cylinder chamber 60 becomes minimum, the volume of the second cylinder chamber 62 becomes maximum, and the amount of compression deformation of the compression coil spring 68 becomes minimum.

Figure 4:
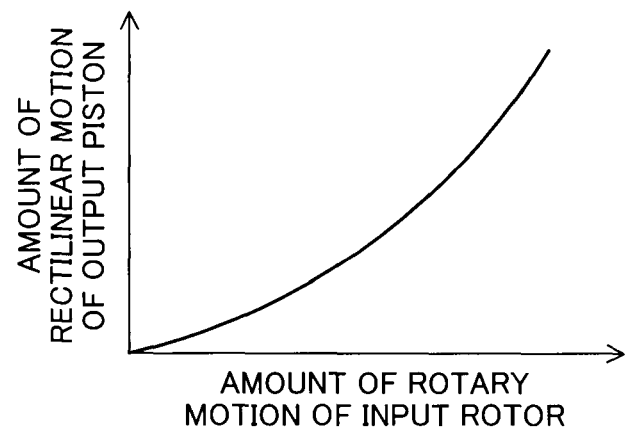
FIG. 4 is a graph showing a relation between the amount rotary motion of an input rotor and the amount of rectilinear motion of an output piston.

Each of the cam grooves 74 is curved and extends such that the angle of inclination with respect to the circumferential direction reduces gradually in the course from its right end toward its left end as viewed in FIG. 2. Accordingly, as shown in FIG. 4, as the amount of rotary motion about the axis 12 of input rotor 14 increases, the transmission means 82 gradually increases the ratio of the amount of rectilinear motion of the output piston 16 to the amount of rotary motion of the input rotor 14, thereby gradually increasing the ratio of the amount of compression deformation of the compression coil spring 68 to the amount of rotary motion of the input rotor 14.

Notably, the magnitude of braking operation by the driver is detected through detection of the treading force which is applied to the pedal portion 80B of the brake pedal 80 by the driver, or through detection of a displacement amount such as a pivoting angle of the brake pedal 80. An unillustrated control apparatus controls braking pressures for individual wheels in accordance with the detected magnitude of braking operation by the driver, whereby the braking forces of the individual wheels are controlled. This braking operation is performed in a similar manner in a second embodiment to be described later.

In the thus-configured first embodiment, when the brake pedal 80 is pivoted about the axis 12 as a result of the driver treading on the pedal portion 80B of the brake pedal 80, the input rotor 14 is rotated about the axis 12 by a rotational angle equal to the pivoting angle of the brake pedal 80. The transmission means 82 converts the rotary motion of the input rotor 14 to a rectilinear motion along the axis 12 and transmits the rectilinear motion to the output piston 16. The rectilinear motion of the output piston 16 deforms the compression coil spring 68. The transmission means 82 transmits an axial reaction force of the compression coil spring 68 from the output piston 16 to the input rotor 14 as a reaction force about the axis 12. The input rotor 14 transmits the reaction force to the brake pedal 80 as a load directed in the direction opposite the treading direction. Thus, the driver receives a reaction force against the treading operation.

Figure 5:
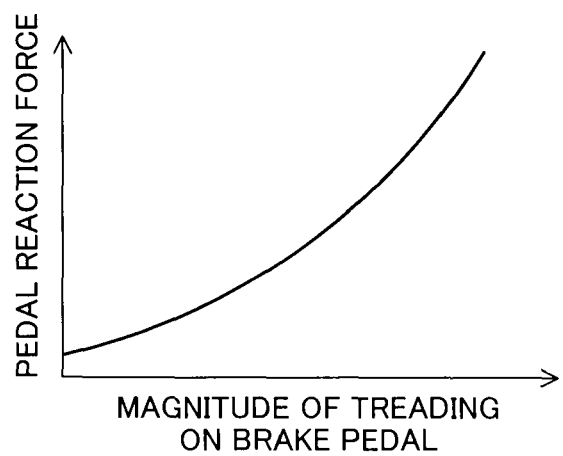
FIG. 5 is a graph showing a relation between the magnitude of treading on a brake pedal and pedal reaction force.

In this case, as the magnitude of treading on the brake pedal 80 increases, the transmission means 82 gradually increases the ratio of the amount of deformation of the compression coil spring 68 to the amount of rotary motion about the axis 12 of the input rotor 14. Thus, the ratio of a pedal reaction force to the magnitude of treading on the brake pedal 80 increases gradually. Accordingly, even though the compression coil spring 68 itself has a linear spring characteristic, as shown in FIG. 5, the characteristic of pedal reaction force vs. the magnitude of treading on the brake pedal 80 becomes a continuous nonlinear characteristic.

Thus, according to the illustrated first embodiment, when the driver treads on the pedal portion 80B of the brake pedal 80, the stroke simulator 10 allows the driver to depress the brake pedal 80 over a treading stroke and increases continuously and nonlinearly a brake reaction force which the driver feels from the brake pedal 80, with the magnitude of treading on the brake pedal 80. Thus, the stroke simulator 10 can provide an optimum brake operation feeling.

Particularly, according to the illustrated first embodiment, the transmission means 82 converts a rotary motion about the axis 12 of the input rotor 14 to a rectilinear motion along the axis 12 of the output piston 16, whereby the compression coils spring 68, which serves as reaction force generation means, is deformed along the axis 12. Therefore, as compared with the second embodiment which is described later and in which the reaction force generation means is deformed in the radial direction, the diameter of the brake stroke simulator 10 can be reduced.

Further, according to the illustrated first embodiment, the input rotor 14 is supported by the housing 18 in such a manner that the input rotor 14 can rotate outside the housing 18; the output piston 16 is supported by the housing 18 in such a manner that the output piston 16 can reciprocate within the housing 18; and the input rotor 14, the output piston 16, and the housing 18 are fitted to one another such that they are aligned on the axis 12. Therefore, as compared with the case where the input rotor 14 and the output piston 16 are arranged along the axis 12, the axial length of the stroke simulator 10 can be reduced. This effect is attained in a third embodiment to be described later as well.

Further, according to the illustrated first embodiment, the input rotor 14 is supported by the housing 18 in such a manner that the input rotor 14 can rotate outside the housing 18; and the output piston 16 is supported by the housing 18 in such a manner that the output piston 16 can reciprocate within the housing 18. Therefore, as compared with a structure in which the input rotor 14 and the output piston 16 are supported by the housing such that the input rotor 14 and the output piston 16 can rotate and reciprocate in relation to each other within the housing, the supporting rigidity of the input rotor 14 and the output piston 16 can be increased. This effect is also attained in a third embodiment to be described later as well.

Second Embodiment

Figure 6:
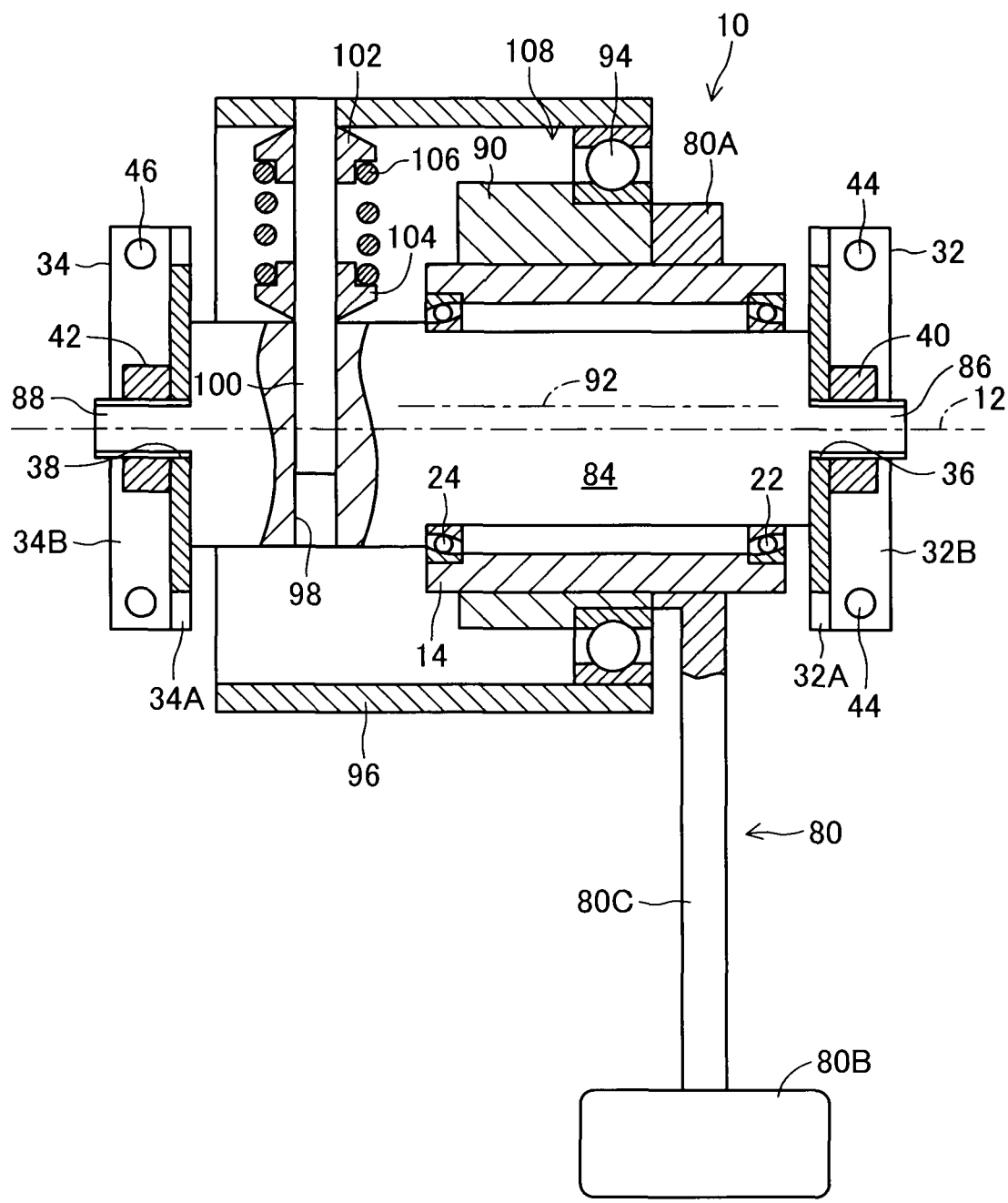
FIG. 6 is an axially-taken sectional view showing a second embodiment of the manipulation simulator according to the present invention and configured as a brake stroke simulator used in a brake-by-wire-type brake apparatus.

FIG. 6 is an axially-taken sectional view showing a second embodiment of the manipulation simulator according to the present invention and configured as a brake stroke simulator used in a brake-by-wire-type brake apparatus. In FIG. 6, members similar to those shown in FIG. 1 are denoted by the same reference numerals appearing in FIG. 1. This convention also applies to the third embodiment to be described later.

In the second embodiment, the input rotor 14 is supported by a cylindrical columnar shaft member 84 via the angular bearings 20 and 22 in such a manner that the input rotor 14 can rotate about the axis 12. The shaft member 84 has support shafts 86 and 88, which are similar to the support shafts 28 and 30 of the first embodiment. The support shafts 86 and 88 project from opposite ends of the shaft member 84 along the axis 12. Further, the support shafts 86 and 88 have respective external threads. The nuts 40 and 42 are in screw-engagement with these external threads. The nut 40 is located on the side of the lug portion 32A of the mount bracket 32 opposite the shaft member 84, and the nut 42 is located on the side of the lug portion 34A of the bracket 34 opposite the shaft member 84. Thus, the shaft member 84 is non-rotatably supported by the mount brackets 32 and 34 to be located therebetween. The shaft member 84 does not have projections corresponding to the projections 52 and 54 of the first embodiment. However, the shaft member 84 may have projections similar to the projections 52 and 54 which reliably prevent rotation of the shaft member 84 about the axis 12.

An eccentric cam member 90 is fitted to the input rotor 14 from the radial outside and is fixed to the input rotor 14 by means of press fit or the like. The eccentric cam member 90 has a cylindrical outer surface whose axis 92 is parallelly deviated from the axis 12. The inner race of a ball bearing 94 is fixed to a small-diameter portion of the eccentric cam member 90 while being in contact with a large-diameter portion of the eccentric cam member 90. The outer race of the ball bearing 94 is fixed, by means of press fit or the like, to the inner circumferential surface of one end portion of a cylindrical member 96, which extends along the axis 92 in such a manner as to surround the eccentric cam member 90. An end cap for preventing entry of foreign matter such as dust and muddy water into the interior of the cylindrical member 96 may be fixed to the other end of the cylindrical member 96 by means of press fit or the like.

Further, the shaft member 84 has a guide hole 98 extending perpendicularly to the axis 12. The guide hole 98 supports a radially inner end portion of a radially extending spring support rod 100 such that the spring support rod 100 can move reciprocally. A radially outer end portion of the spring support rod 100 is fixed to the other end portion of the cylindrical member 96 by means of press fit or the like. Accordingly, the cylindrical member 96 and the spring support rod 100 are supported in such a manner as to be rectilinearly movable along the spring support rod 100 in relation to the shaft member 84 without rotation in relation to the shaft member 84.

Two spring seat members 102 and 104 are fitted to the spring support rod 100 at respective positions located between the shaft member 84 and the cylindrical member 96. The spring seat members 102 and 104 are fitted to the spring support rod 100 in such a manner as to be displaceable in relation to the spring support rod 100 along the longitudinal direction of the spring support rod 100. However, the spring seat member 102 located on a side toward the cylindrical member 96 may be fixed to the spring support rod 100 or the cylindrical member 96. A compression coil spring 106, which serves as a reaction force generation member, is elastically attached between the spring seat members 102 and 104 in such a state as to surround the spring support rod 100.

Particularly, in the illustrated embodiment, the direction of eccentricity of the axis 92 with respect to the axis 12; in other words, the direction of eccentricity of the eccentric cam member 90, is toward the outer end of the spring support rod 100 along the spring support rod 100. Accordingly, when no treading force is applied to the brake pedal 80 and the input rotor 14 is positioned at its initial position, the distance between the shaft member 84 and the cylindrical member 96 as measured along the spring support rod 100 becomes maximum. Thus, the distance between the spring seat members 102 and 104 becomes maximum, so that the amount of compressive deformation of the compression coil spring 106 becomes minimum.

When the input rotor 14 is rotated about the axis 12 as a result of the driver treading on the brake pedal 80, the eccentric cam member 90 rotates about the axis 12 such that the axis 92 rotates about the axis 12. Thus, the cylindrical member 96 moves rectilinearly downward in FIG. 6 along the spring support rod 100, whereby the distance between the shaft member 84 and the cylindrical member 96 as measured along the spring support rod 100 reduces. The rate of reduction in the distance increases with the amount of rotation of the eccentric cam member 90. Other structural features of the second embodiment are similar to those of the above-described first embodiment.

In the second embodiment, the eccentric cam member 90, the ball bearing 94, the cylindrical member 96, the spring support rod 100, etc. cooperatively constitute transmission means 108 for converting a rotary motion about the axis 12 of the input rotor 14 to a rectilinear motion of the cylindrical member 96 perpendicular to the axis 12. The cylindrical member 96 functions as an output member for compressively deforming the compression coil spring 106, which serves as reaction force generation means. Further, the transmission means 108 transmits a reaction force generated by the compression coil spring 106 to the eccentric cam member 90 and the input rotor 14 as a reaction torque about the axis 12. The reaction torque transmitted to the input rotor 14 is transmitted to the brake pedal 80 as a torque for pushing back the brake pedal 80 about the axis 12.

Also, in the second embodiment, as the amount of rotary motion of the input rotor 14 about the axis 12 increases, the transmission means 108 gradually increases the ratio of the amount of such a relative rectilinear motion between the spring seat members 102 and 104 to approach each other, to the amount of rotary motion about the axis 12 of the input rotor 14, thereby gradually increasing the ratio of the amount of compressive deformation of the compression coil spring 106 to the amount of rotary motion of the input rotor 14, whereby the ratio of the reaction torque to the amount of rotary motion of the input rotor 14 gradually increases.

In the illustrated second embodiment, as in the case of the above-described first embodiment, when the driver treads on the pedal portion 80B of the brake pedal 80, the stroke simulator 10 allows the driver to depress the brake pedal 80 over a treading stroke and increases continuously and nonlinearly a brake reaction force which the driver feels from the brake pedal 80, with the magnitude of treading on the brake pedal 80. Thus, the stroke simulator 10 can provide an optimum braking operation feeling.

Particularly, in the illustrated second embodiment, the input rotor 14, which rotates about the axis 12 together with the brake pedal 80, does not constitute the transmission means 108. Specifically, the cam groves 74 employed in the first embodiment are not provided in the input rotor 14, and the input rotor 14 is merely supported by the shaft member 84 for rotation about the axis 12. Therefore, as compared with the case of the first embodiment, the supporting rigidity of the brake pedal 80 can be increased.

Third Embodiment

Figure 7:
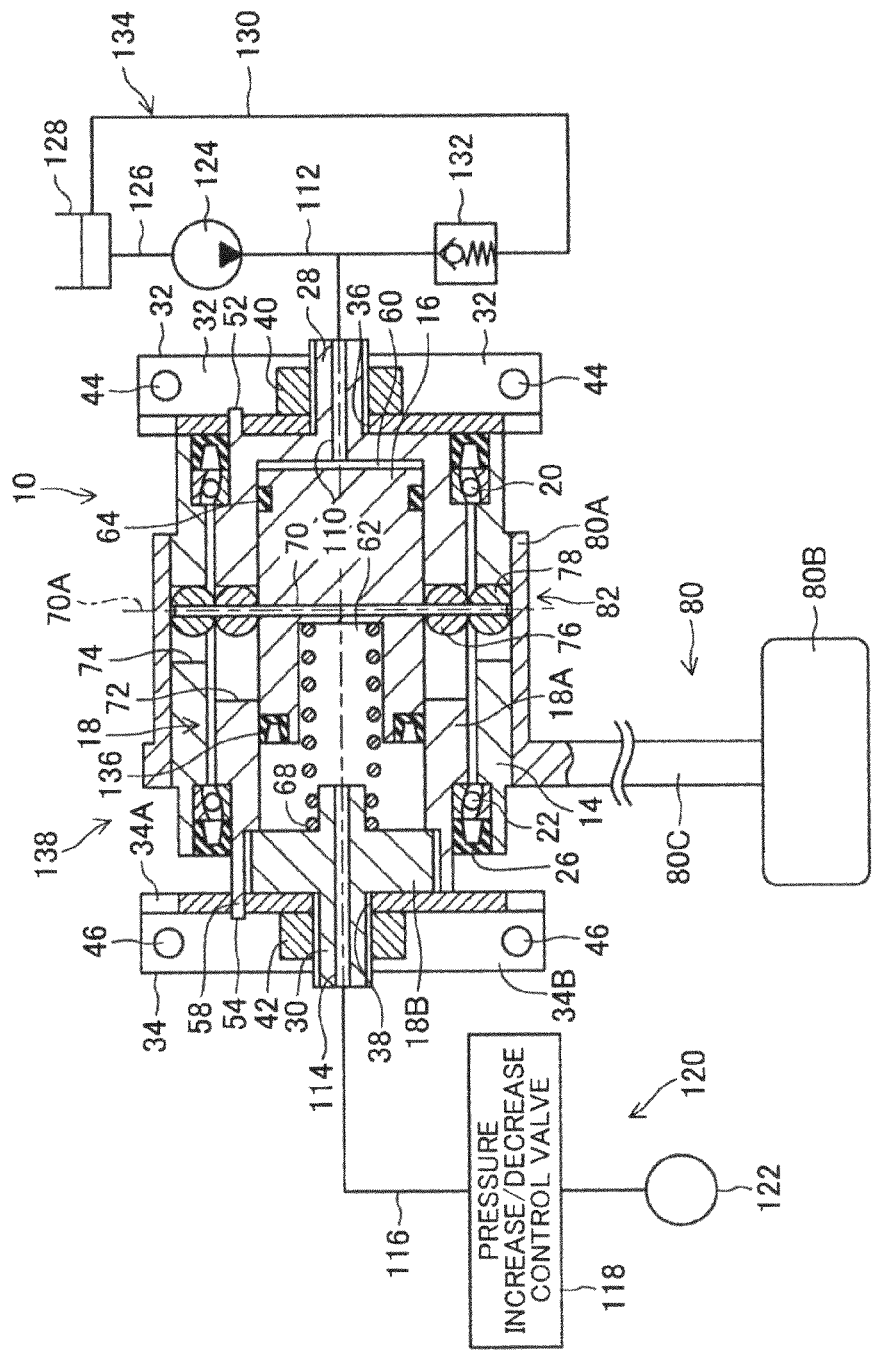
FIG. 7 is an axially-taken sectional view showing a third embodiment of the manipulation simulator according to the present invention and configured as a master-cylinder-built-in-type brake stroke simulator.

FIG. 7 is an axially-taken sectional view showing a third embodiment of the manipulation simulator according to the present invention and configured as a master-cylinder-built-in-type brake stroke simulator.

In the third embodiment, a communication hole 110, which extends along the axis 12 and communicates at one end thereof with the first cylinder chamber 60, is provided in the support shaft 28 and the end wall of the body 18A of the housing 18. One end of a high pressure pipe 112 is connected to the communication hole 110. Similarly, a communication hole 114, which extends along the axis 12 and communicates at one end thereof with the second cylinder chamber 62, is provided in the support shaft 30 and the end cap 18B of the housing 18. One end of a brake liquid pressure supply pipe 116 is connected to the communication hole 114. The other end of the brake liquid pressure supply pipe 116 is connected to a wheel cylinder 122 of a braking force generation apparatus 120 via a known pressure increase/decrease control valve 118 provided for each wheel of the vehicle.

The other end of the high pressure pipe 112 is connected to the discharge port of an oil pump 124, and the suction port of the oil pump 124 is connected via a low pressure pipe 126 to a reservoir 128 which stores oil. One end of a return pipe 130 is connected to the high pressure pipe 112, and the other end of the return pipe 130 is connected to the reservoir 128. A normally-open-type linear solenoid valve 132 is provided in the middle of the return pipe 130. An unillustrated electronic control apparatus controls the linear solenoid valve 132 so as to control a difference pressure at the linear solenoid valve 132, to thereby control the pressure within the high pressure pipe 112; i.e., the pressure of oil within the first cylinder chamber 60. Accordingly, the oil pump 124, the linear solenoid valve 132, the electronic control apparatus, etc. cooperatively constitute a pressure control apparatus 134 for controlling the oil pressure within the first cylinder chamber 60 when necessary.

The pressure control apparatus 134 may control the oil pressure in an arbitrary manner, for example, in a manner for assisting the driver's operation of treading on the brake pedal 80. For example, the oil pressure control may be performed as follows. The magnitude of braking operation through driver's treading on the brake pedal 80 is detected by a treading force sensor or stroke sensor not shown in FIG. 7. A target braking pressure; i.e., a target pressure within the wheel cylinder 122, is calculated on the basis of the magnitude of braking operation. A deviation between the target pressure and the actual pressure within the wheel cylinder 122 detected by a pressure sensor is calculated, and the pressure within the first cylinder chamber 60 is controlled such that the deviation becomes zero.

Further, as shown in FIG. 7, the antifriction ring 66 and a communication hole corresponding to the communication hole 16C employed in the first embodiment are not provided on the output piston 16 of the third embodiment. Instead, a cup seal 136, which extends annularly about the axis 12, is attached to the end portion of the output piston 16 on the side toward the second cylinder chamber 62. The cup seal 136 is formed of an elastic material such as rubber. While allowing the output piston 16 to rectilinearly move along the axis 12 in relation to the housing 18, the cup seal 136 isolates the second cylinder chamber 62 from the first cylinder chamber 60 and the guide grooves 72. Notably, the second cylinder chamber 62 is also filled with oil. Further, other structural features of the third embodiment are similar to those of the above-described first embodiment.

In the illustrated third embodiment, the action and effects similar to those achieved in the first embodiment can be achieved. That is, when the driver treads on the pedal portion 80B of the brake pedal 80, the stroke simulator 10 allows the driver to depress the brake pedal 80 over a treading stroke and increases continuously and nonlinearly a brake reaction force which the driver feels from the brake pedal 80, with the magnitude of treading on the brake pedal 80. Thus, the stroke simulator 10 can provide an optimum brake operation feeling.

Further, in the illustrated third embodiment, when the output piston 16 is driven toward the end cap 18B as a result of the driver treading on the brake pedal 80, oil within the second cylinder chamber 62 is pressurized by a force corresponding to the treading force applied to the brake pedal 80, whereby oil having a pressure corresponding to the treading force can be supplied to the wheel cylinder 122. Thus, the output piston 16 and the housing 18 also function as a master cylinder 138. Accordingly, the stroke simulator 10 can be caused to function as a master-cylinder-built-in-type brake stroke simulator.

Particularly, in the illustrated third embodiment, the first cylinder chamber 60 is connected to the pressure control apparatus 134 via the communication hole 110, and the pressure within the first cylinder chamber 60 can be controlled by the pressure control apparatus 134. Therefore, it is possible to assist the driver's operation of treading on the brake pedal 80 or control the braking pressure independently of the driver's operation of treading on the brake pedal 80.

Further, the braking force generation apparatus 120 including the wheel cylinder 122 generates a braking force by pressing a friction member, such as a brake pad, against a rotary member, such as a brake rotor, which rotates together with a wheel, in accordance with the pressure within the wheel cylinder 122. At that time, components of the braking force generation apparatus 120 elastically deform in proportion to the pressure within the wheel cylinder 122, and generate a reaction force. Accordingly, as indicated by an imaginary line in FIG. 7, the braking force generation apparatus 120 can be considered to be equivalent to a cylinder-piston apparatus in which a piston 120A is urged to reduce the volume of a cylinder chamber 120C by means of a compression coil spring 120B having a linear spring characteristic.

Therefore, in the third embodiment, the braking force generation apparatus 120 also functions as reaction force generation means. That is, a rectilinear motion of the output piston 16 is transmitted to the piston 120A of the braking force generation apparatus 120 via oil within the brake liquid pressure supply pipe 116, and the piston 120A, which serves as an output member, deforms the compression coil spring 120B. Further, the reaction force produced by the compression coil spring 120B is transmitted to the output piston 16 via the piston 120A and the pressure of oil within the brake liquid pressure supply pipe 116 and the second cylinder chamber 62.

In the above-described first through third embodiments, the transmission means 82 converts a rotation motion about the axis 12 of the input rotor 14 to a rectilinear motion along the axis 12 of the output piston 16, whereby the compression coil spring 68 is compressively deformed along the axis 12. Therefore, all the component members can be disposed with the axis 12 used as a reference.

Further, in the above-described first through third embodiments, when the input rotor 14 is positioned at its initial position, since the compression coil spring 68 urges the output piston 16 rightward as viewed in FIG. 7, the load transmission rod 70, etc. are positioned at their rightmost initial positions. Thus, at the time of nonbraking, the occurrence of shaky movement of the output piston 16 can be effectively prevented.

While the present invention has been described in detail with reference to the above particular embodiments, it will be apparent to those skilled in the art that the present invention is not limited thereto, but may be embodied in various other forms without departing from the scope of the invention.

For example, in the above-described first and second embodiments, the manipulation simulator according to the present invention is configured as a brake stroke simulator used in a brake-by-wire-type brake apparatus. However, the first and second embodiments may be applied to a hydraulic brake apparatus. In such a case, an operation rod of a master cylinder apparatus is pivotably connected to the arm portion 80C of the brake pedal 80.

In the above-described third embodiment, the first cylinder chamber 60 is connected to the pressure control apparatus 134 via the communication hole 110, and the pressure within the first cylinder chamber 60 is controlled by the pressure control apparatus 134. However, the communication hole 110 and the pressure control apparatus 134 may be omitted. Alternatively, the above-described first embodiment may be modified such that a communication hole and a pressure control apparatus which are similar to the communication hole 110 and the pressure control apparatus 134, respectively, of the third embodiment, are added so as to assist an operator's operation.

In the above-described third embodiment, the compression coil spring 68 is elastically disposed within the second cylinder chamber 62. However, since the baking force generation apparatus 120 functions as reaction force generation means as described above, the compression coil spring 68, which serves as reaction force generation means, may be omitted. In such a case, a return spring may be provided between the arm portion 80C and the vehicle body in order to urge the bake pedal 80 in the direction opposite the treading direction.

In the above-described first and third embodiments, the input rotor 14 is supported by the housing 18 such that the input rotor 14 can rotate at the outside of the housing 18, and the output piston 16 is supported by the housing 18 such that the output piston 16 can reciprocate within the housing 18. However, the first and third embodiments may be modified such that both the input rotor 14 and the output piston 16 are accommodated within the housing 18 such that the input rotor 14 and the output piston 16 can rotate and reciprocate in relation to each other within the housing.

Furthermore, in the above-described embodiments, the manipulation simulator is a brake stroke simulator, and the input rotor 14 is driven to rotate about the axis 12 by means of braking operation by the driver. However, the present invention may be applied to, for example, a manipulation simulator of an automotive accelerator pedal which allows an operator to operate operation means and applies a required operational reaction force to the operator via the operation means. The brake pedal 80, which serves as operation means, is pivoting operation means which is pivoted about the axis 12. However, the operation means may be rotary operation means which is rotated about the axis 12.

The invention claimed is:
1. A rotary-motion-input manipulation simulator comprising:
  an input member which is rotatable about an axis;
  operation means which rotates about the axis when operated by an operator, and imparts a rotary motion to the input member;

an output member whose rectilinear motion deforms a reaction force generation means which generates a reaction force according to an amount of deformation thereof; and transmission means provided between the input member and the output member and adapted to convert the rotary motion of the input member to a rectilinear motion and transmit the rectilinear motion to the output member and to transmit the reaction force of the reaction force generation means to the input member via the output member, the manipulation simulator allowing the operator to operate the operation means, and applying an operational reaction force to the operator via the operation means, wherein the reaction force generation means generates the reaction force linearly according to the amount of deformation thereof;

the transmission means is configured to continuously and nonlinearly vary a ratio of an amount of rectilinear motion of the output member to an amount of rotary motion of the input member according to the amount of rotary motion of the input member; and the input member and the output member are coaxial with respect to the axis and are fitted to each other such that they can move rotatably and rectilinearly in relation to each other, the output member being radially inward of the input member.

2. A rotary-motion-input manipulation simulator according to claim 1, wherein the operation means is a brake pedal.

3. A rotary-motion-input manipulation simulator according to claim 1, wherein the transmission means includes a cam provided on the input member and a cam follower provided on the output member and engaged with the cam, and, by means of the cam follower moving to follow the cam, the ratio of the amount of rectilinear motion of the output member to the amount of rotary motion of the input member is varied continuously and nonlinearly according to the amount of rotary motion of the input member.

4. A rotary-motion-input manipulation simulator according to claim 1, wherein the transmission means converts a rotary motion of the input member to a rectilinear motion and transmits the rectilinear motion to the output member, and the transmission means converts a reaction force which the output member receives from the reaction force generation means, to a reaction torque directed opposite a direction in which the input member rotates to increase the amount of rotary motion thereof and transmits the reaction torque to the input member.

5. A rotary-motion-input manipulation simulator according to claim 3, wherein one of the cam and the cam follower is a cam groove, whereas the other of the cam and the cam follower is a cam groove engagement member which is engaged with the cam groove and moves along the cam groove, and the cam groove extends while being inclined with respect to a circumferential direction about the axis and is curved such that an angle of inclination with respect to the circumferential direction varies gradually and continuously.

6. A rotary-motion-input manipulation simulator according to claim 5, wherein the cam groove engagement member has a shaft member which is fixed to the output member and extends in a radial direction, and a cam roller which is rotatably supported by the shaft member and is rollably engaged with a wall surface of the cam groove.

7. A rotary-motion-input manipulation simulator according to claim 6, wherein the cam groove engagement member has a guide roller which is rotatably supported by the shaft member and is rollably engaged with a wall surface of a guide groove extending along the direction of rectilinear motion of the output member.

8. A rotary-motion-input manipulation simulator according to claim 1, wherein, through subjection to deformation along the axis, the reaction force generation means generates a reaction force along the axis linearly according to the amount of deformation.

9. A rotary-motion-input manipulation simulator according to claim 1, wherein the output member is supported by the housing to be rectilinearly movable, and defines two cylinder chambers on opposite sides thereof in cooperation with the housing; and one of the cylinder chambers whose volume decreases with an increase in the amount of rotary motion of the input member is filled with a working fluid, and is connected to and communicates with an apparatus which is operated by the pressure of the working fluid.

10. A rotary-motion-input manipulation simulator according to claim 9, wherein the cylinder chamber whose volume increases with the amount of rotary motion of the input member is connected to and communicates with means which controls the pressure within the cylinder chamber.

11. A rotary-motion-input manipulation simulator according to claim 1, wherein the transmission means converts a rotary motion of the input member to a rectilinear motion in a direction intersecting the axis, and transmits the rectilinear motion to the output member.

* * * * *